(12) United States Patent
Lanier, Jr. et al.

(10) Patent No.: US 11,125,597 B2
(45) Date of Patent: *Sep. 21, 2021

(54) VOLUMETRIC MEASUREMENT DEVICE, SYSTEM AND METHOD

(71) Applicant: DEKA Products Limited Partnership, Manchester, NH (US)

(72) Inventors: Gregory R. Lanier, Jr., Merrimack, NH (US); John M. Kerwin, Manchester, NH (US); Colin H. Murphy, Cambridge, MA (US); Larry B. Gray, Merrimack, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 311 days.

This patent is subject to a terminal disclaimer.

(21) Appl. No.: 16/188,568

(22) Filed: Nov. 13, 2018

(65) Prior Publication Data

US 2019/0078922 A1 Mar. 14, 2019

Related U.S. Application Data

(63) Continuation of application No. 15/187,228, filed on Jun. 20, 2016, now Pat. No. 10,126,157, which is a continuation of application No. 13/788,864, filed on Mar. 7, 2013, now Pat. No. 9,372,104.

(60) Provisional application No. 61/607,880, filed on Mar. 7, 2012.

(51) Int. Cl.
*G01F 17/00* (2006.01)
*G01F 22/02* (2006.01)
*G01F 1/66* (2006.01)
*G01F 23/296* (2006.01)

(52) U.S. Cl.
CPC ............... *G01F 17/00* (2013.01); *G01F 1/66* (2013.01); *G01F 22/02* (2013.01); *G01F 23/296* (2013.01)

(58) Field of Classification Search
CPC . G01F 17/00; G01F 1/66; G01F 22/02; G01F 23/296
See application file for complete search history.

(56) References Cited

U.S. PATENT DOCUMENTS

| | | | | |
|---|---|---|---|---|
| 4,657,490 A * | 4/1987 | Abbott | ............ | A61M 5/14224 417/478 |
| 5,349,852 A * | 9/1994 | Kamen | ............ | A61M 5/16809 73/149 |
| 5,575,310 A * | 11/1996 | Kamen | ............ | A61M 5/365 137/614.11 |
| 5,769,608 A * | 6/1998 | Seale | ............ | F04B 43/0733 417/53 |

(Continued)

*Primary Examiner* — Nathaniel T Woodward
*Assistant Examiner* — Philip L Cotey
(74) *Attorney, Agent, or Firm* — Reid Knott Cunningham (57) ABSTRACT

An acoustic volume sensing device is disclosed. The device includes a housing comprising a reference volume chamber and a variable volume chamber, the reference volume chamber and the variable volume chamber connected by a resonant port, a first MEMS microphone located in acoustic relation to the variable volume chamber, a second MEMS microphone located in acoustic relation to the reference volume chamber, a MEMS speaker located in acoustic relation to the reference volume chamber, and a circuit board in electric connection with the first and second MEMS microphones and the MEMS speaker.

28 Claims, 6 Drawing Sheets

(56) References Cited

U.S. PATENT DOCUMENTS

| | | | | |
|---|---|---|---|---|
| 6,485,263 B1* | 11/2002 | Bryant | F04B 51/00 | 417/53 |
| 6,631,196 B1* | 10/2003 | Taenzer | H04B 1/04 | 381/312 |
| 7,902,843 B2* | 3/2011 | Fang | G01L 9/0073 | 324/686 |
| 8,693,711 B2* | 4/2014 | Ho | H04R 19/005 | 381/174 |
| 9,372,104 B2* | 6/2016 | Lanier, Jr. | G01F 23/296 | |
| 9,649,433 B2* | 5/2017 | Lanier, Jr. | A61M 5/14244 | |
| 10,126,157 B2* | 11/2018 | Lanier, Jr. | G01F 17/00 | |
| 2002/0102004 A1* | 8/2002 | Minervini | B81B 7/0064 | 381/175 |
| 2005/0072248 A1* | 4/2005 | Suginouchi | G01F 1/66 | 73/861.27 |
| 2007/0013052 A1* | 1/2007 | Zhe | H01L 23/057 | 257/704 |
| 2007/0040231 A1* | 2/2007 | Harney | B81B 7/007 | 257/415 |
| 2007/0205492 A1* | 9/2007 | Wang | B81C 1/0023 | 257/659 |
| 2007/0219480 A1* | 9/2007 | Kamen | A61B 5/0024 | 604/20 |
| 2007/0228071 A1* | 10/2007 | Kamen | H04B 7/2609 | 222/52 |
| 2008/0192962 A1* | 8/2008 | Halteren | H04R 1/222 | 381/170 |
| 2009/0129622 A1* | 5/2009 | Chen | H04R 19/016 | 381/369 |
| 2009/0275896 A1* | 11/2009 | Kamen | A61M 5/16804 | 604/151 |
| 2010/0052082 A1* | 3/2010 | Lee | B81B 7/0061 | 257/416 |
| 2010/0155864 A1* | 6/2010 | Laming | B81C 99/004 | 257/416 |
| 2010/0198183 A1* | 8/2010 | Lanigan | H01Q 9/265 | 604/406 |
| 2011/0071465 A1* | 3/2011 | Wang | A61M 1/16 | 604/67 |
| 2011/0126632 A1* | 6/2011 | McNeil | G01L 19/0092 | 73/718 |
| 2011/0150261 A1* | 6/2011 | Ho | H04R 19/005 | 381/361 |
| 2011/0165717 A1* | 7/2011 | Lee | B81B 7/0061 | 438/50 |
| 2011/0190694 A1* | 8/2011 | Lanier, Jr. | A61M 5/14224 | 604/67 |
| 2012/0043627 A1* | 2/2012 | Lin | G01P 15/125 | 257/415 |
| 2012/0148083 A1* | 6/2012 | Knauss | H04R 19/04 | 381/361 |
| 2015/0101395 A1* | 4/2015 | Dehe | G01N 29/2425 | 73/24.02 |

* cited by examiner

VOLUMETRIC MEASUREMENT DEVICE, SYSTEM AND METHOD

CROSS REFERENCE TO RELATED APPLICATIONS

The present application is a Continuation of U.S. patent application Ser. No. 15/187,228, filed Jun. 20, 2016, and entitled Volumetric Measurement Device, System and Method, now U.S. Pat. No. 10,126,157, issued Nov. 13, 2018, which is a Continuation of U.S. patent application Ser. No. 13/788,864, filed Mar. 7, 2013, and entitled Volumetric Measurement Device, System and Method, now U.S. Pat. No. 9,372,104, issued Jun. 21, 2016, a Non-Provisional application which claims the benefit of U.S. Provisional Patent Application Ser. No. 61/607,880, filed Mar. 7, 2012 and entitled Volumetric Measurement Device, System and Method, each of which is hereby incorporated herein by reference in its entirety.

FIELD OF THE INVENTION

This application relates generally to volumetric measurement, and more particularly to volumetric measurement devices, systems and methods.

BACKGROUND

Many potentially valuable medicines or compounds, including biologicals, are not orally active due to poor absorption, hepatic metabolism or other pharmacokinetic factors. Additionally, some therapeutic compounds, although they can be orally absorbed, are sometimes required to be administered so often it is difficult for a patient to maintain the desired schedule. In these cases, parenteral delivery is often employed or could be employed.

Effective parenteral routes of drug delivery, as well as other fluids and compounds, such as subcutaneous injection, intramuscular injection, and intravenous (IV) administration include puncture of the skin with a needle or stylet. Users of parenterally delivered drugs may benefit from a wearable device that would automatically deliver needed drugs/compounds over a period of time.

To this end, there have been efforts to design devices, including portable and wearable devices, for the controlled release of therapeutics. Such devices are known to have a reservoir such as a cartridge, syringe, or bag, and to be electronically controlled. These devices suffer from a number of drawbacks including the malfunction rate. Reducing the size, weight and cost of these devices is also an ongoing challenge. Additionally, these devices often do not determine the volume of fluid delivered.

SUMMARY OF THE INVENTION

In accordance with one implementation, an acoustic volume sensing device is disclosed. The device includes a housing comprising a reference volume chamber and a variable volume chamber, the reference volume chamber and the variable volume chamber connected by a resonant port, a first MEMS microphone located in acoustic relation to the variable volume chamber, a second MEMS microphone located in acoustic relation to the reference volume chamber, a MEMS speaker located in acoustic relation to the reference volume chamber, and a circuit board in electric connection with the first and second MEMS microphones and the MEMS speaker.

Some embodiments of this aspect of the invention include one or more of the following. Wherein the device further includes a hydrophobic, substantially acoustically transparent mesh device located in the resonant port. Wherein the first and second MEMS microphone and MEMS speaker are integrated into a single package.

In accordance with one implementation a method for determining a volume of fluid that has exited a measurement chamber is disclosed. The method includes completing an acoustic volume sensing measurement of a measurement chamber where the measurement chamber is at a first predetermined pressure, pumping fluid into the measurement chamber until the measurement chamber reaches a second predetermined pressure, completing an acoustic volume sensing measurement of a measurement chamber where the measurement chamber is at the second predetermined pressure, reducing the measurement chamber pressure to the first predetermined pressure, and completing an acoustic volume sensing measurement of a measurement chamber where the measurement chamber is at the second predetermined pressure.

In accordance with one implementation, an acoustic volume measurement device is disclosed. The acoustic volume measurement device including a port comprising a hydrophobic, substantially acoustically transparent mesh device located in the port.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF VARIOUS EMBODIMENTS

Various embodiments of Acoustic Volume Sensing (AVS) are included herein as embodiments of AVS. These embodiments include, but are not limited to, those described in U.S. patent application Ser. No. 11/704,899, filed Feb. 9, 2007 and entitled Fluid Delivery Systems and Methods, now U.S. Published Application No. US-2007-0228071, published Oct. 4, 2007, which is hereby incorporated herein by reference in its entirety, and U.S. patent application Ser. No. 12/981,350, filed Dec. 29, 2010 and entitled Infusion Pump Assembly, now U.S. Published Application No. US-2011-0190694, published Aug. 4, 2011, which is hereby incorporated herein by reference in its entirety. Various embodiments include using AVS to determine the volume of a fluid delivered by determining a first volume in a chamber, pumping fluid from the chamber, then determining a second volume in the chamber, and calculating the volume of fluid delivered. This calculation may be used in conjunction with various devices, including, but not limited to, infusion pumps which may include, but are not limited to, IV infusion pumps and/or wearable infusion pumps, for example, insulin pumps.

U.S. patent application Ser. No. 13/725,790, filed Dec. 21, 2012 and entitled System, Method, and Apparatus for Infusing Fluid is hereby incorporated herein by reference in its entirety. The various AVS related structures/devices described together with the related description, may be incorporated, fully or partially, into any type of device, for example, including but not limited to, wearable infusion pumps. Thus, AVS may be used with respect to various devices which include, but are not limited to, infusion pumps and micro infusion pumps. With respect to the various embodiments of AVS and the various device configurations that may be used with respect to AVS measurement, in some embodiments, all of the AVS measurements may be taken at known pressures. For example, in some embodiments, the various AVS measurements may be calculated at different pressures so that if there is air present in the chamber, the air will be identified. Thus, in some embodiments, an AVS measurement may be taken at one pressure, then, without moving the fluid, the AVS measurement may be taken at another, different pressure. Using this technique, air bubbles may be detected. Thus, in some embodiments, AVS may be used to detect air bubbles.

In some embodiments, the AVS measurements may be taken at the same pressure. In these embodiments, thus, if there is air present in the AVS chamber, the air will not be compressed between the first, second, etc., measurements and therefore, the air does not affect the accuracy of the volumetric measurement. In some embodiments, the AVS measurements may be taken at zero pressure.

Figure 1:
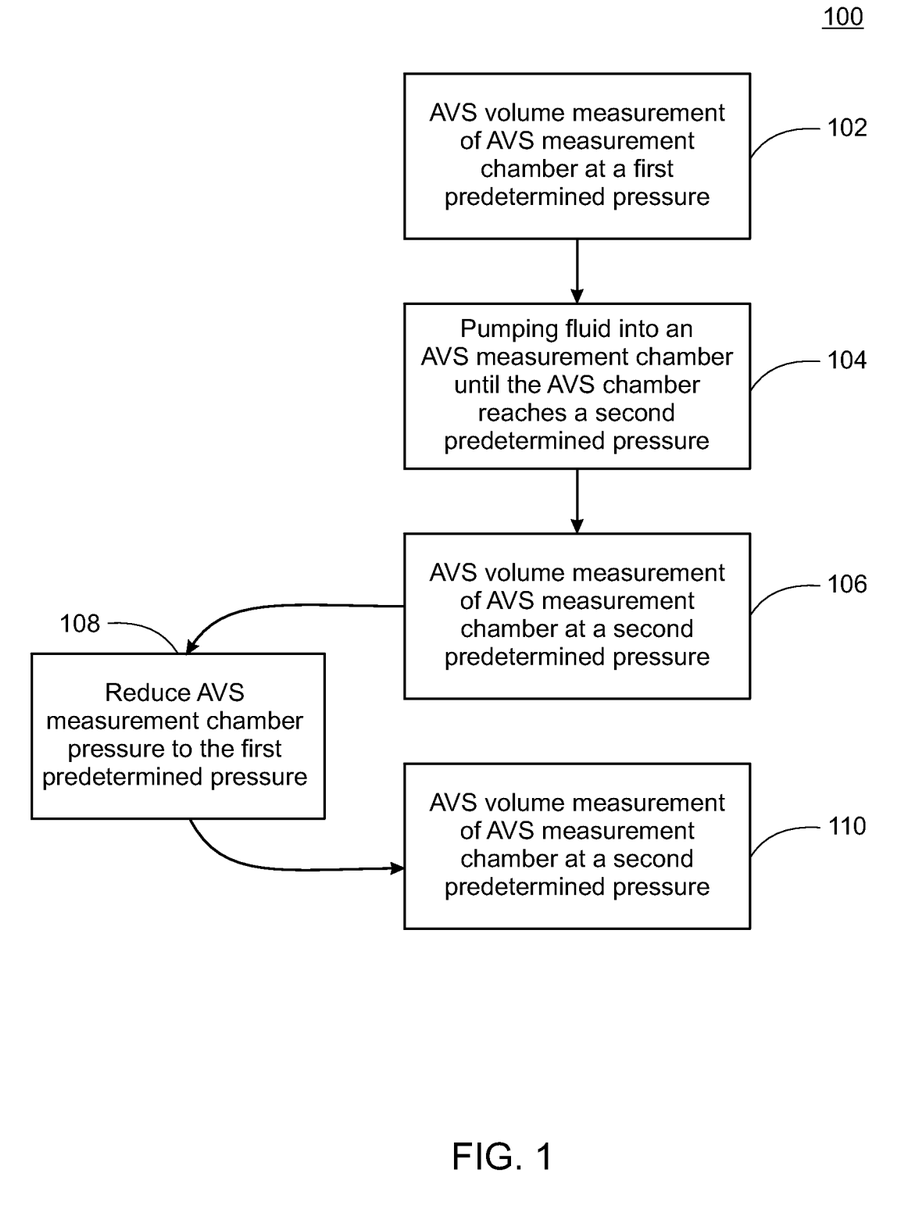
FIG. 1 is a block diagram of one method according to one embodiment.

Referring now to FIG. 1, in some embodiments, downstream from the AVS measurement chamber may be a restrictive pathway so as to reduce the pressure within the AVS measurement chamber slowly. For example, a method may be used for determining the volume of fluid exiting an AVS measurement chamber. This method 100 may, in some embodiments, include where the AVS measurement chamber may be at a first predetermined pressure, e.g., 5 pounds per square inch ("PSI") and an AVS volume measurement of AVS measurement chamber may be completed 102. Fluid may then be pumped into the AVS measurement chamber to a second predetermined pressure 104, e.g. 10 PSI. Another AVS measurement is completed 106. Next, the pressure in the AVS measurement chamber is reduced, slowly, to the first predetermined pressure 108, e.g. 5 PSI. Another AVS measurement is then taken 110. In various embodiments, the predetermined pressures may be greater than or less than the examples given herein. However, in various embodiments, the first predetermined pressure is less than the second predetermined pressure.

In some embodiments, the AVS measurement chamber may include a downstream active check valve with a cracking pressure equal to the first predetermined pressure, e.g. 5 PSI, thus, the valve will close when the pressure falls below the second predetermined pressure, e.g. 5 PSI. In some embodiments, a pump may be introduced into the AVS measurement chamber. Some embodiments may include a downstream active check valve and a restrictive pathway. Some embodiments may include a restrictive pathway.

Thus, using this method, the volume of fluid that flowed out of the AVS measurement chamber may be determined.

Figure 2:
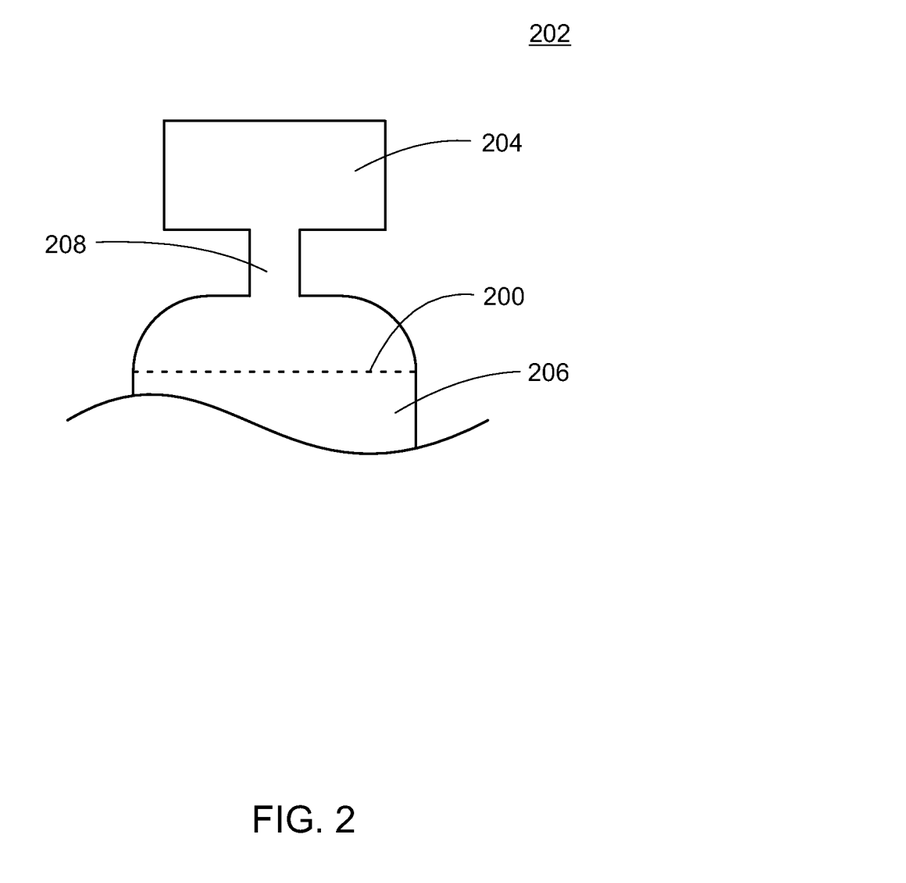
FIG. 2 is an illustrative view of one embodiment of an AVS device.

Referring now to FIG. 2, in some embodiments of the various embodiments of AVS, a membrane or mesh cover may be installed into the port to prevent unwanted debris and fluid from entering the port. In some embodiments, a screen may be used. In some embodiments, the screen may be a hydrophobic screen, in other embodiments; the screen may be a porous material. In some embodiments, the screen may be a mesh material. In some embodiments, a hydrophobic membrane may be used. In various embodiments, the screen is substantially acoustically transparent therefore, not affecting the accuracy of the volumetric measurement. Referring to FIG. 2, an illustrative view of one embodiment of an AVS device 202 with a mesh screen 200 is shown. In some embodiments, the spring 628 may not be used in the AVS device 202. The AVS device 202 may include a reference volume 204, a variable volume 206 and a resonant port 208. Other elements may also include a microphone in the reference volume, a speaker in the reference volume and a microphone in the variable volume. The AVS device 202 determines the volume of fluid (which may include liquid and/or gas) in the variable volume 206. In various embodiments, the AVS device 202 may be used to determine the volume of fluid (which may include liquid and/or gas) in the variable volume 206, then an additional volume of fluid may be pumped or otherwise may enter the variable volume 206, then AVS device 202 may determine the volume of fluid (which may include liquid and/or gas) in the variable volume 206, then, the volume of fluid may exit the variable volume 206. Next, AVS device 202 may determine the volume of fluid (which may include liquid and/or gas) in the variable volume 206. Using these measurements, the volume of fluid that exited the variable volume 206 may be determined.

Figure 3:
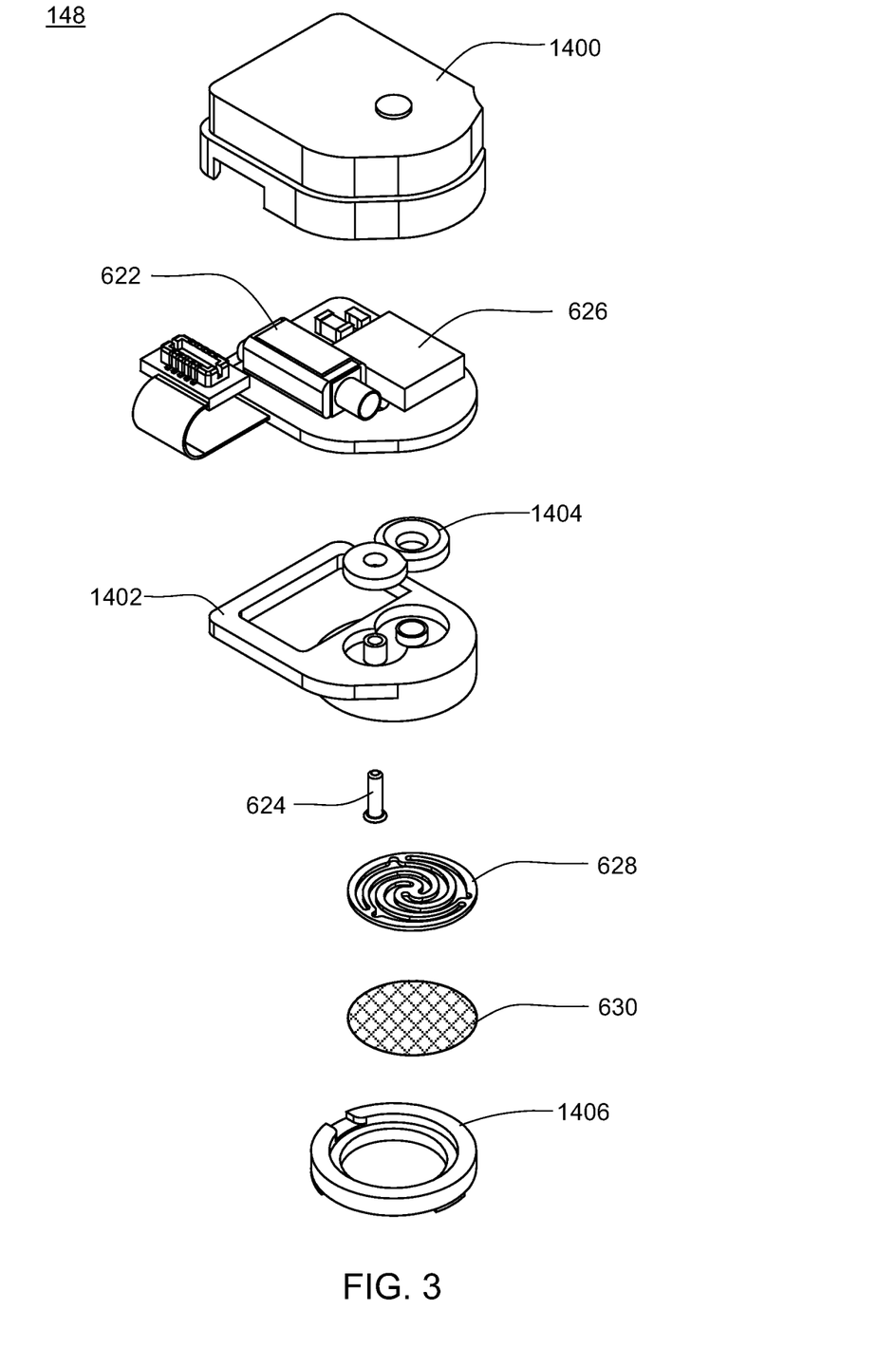
FIG. 3 is an exploded view of one embodiment of an AVS measurement assembly.

In various embodiments where a mesh barrier is used, the mesh barrier may be attached to the port area such that the mesh barrier is not compliant/non-movable. Referring now also to FIG. 3, in some embodiments, a mesh screen 630 may be sandwiched between the spring 628 and the ring 1406. In various embodiments, the mesh screen 630 may be made from any hydrophobic, substantially acoustically transparent material. In some embodiments, the mesh screen 630 may be a POREX plug, for example, using POREX made by POREX Corporation, Fairburn, Ga., U.S.A. In some embodiments, the spring may not be used in the AVS device. The AVS device 148 also includes an upper housing 1400, speaker assembly 622, reference microphone 626, seal assembly 1404, lower housing 1402, port assembly 624, spring diaphragm 628, and retaining ring assembly 1406. In some embodiments, a spring diaphragm may not be included.

Figure 4:
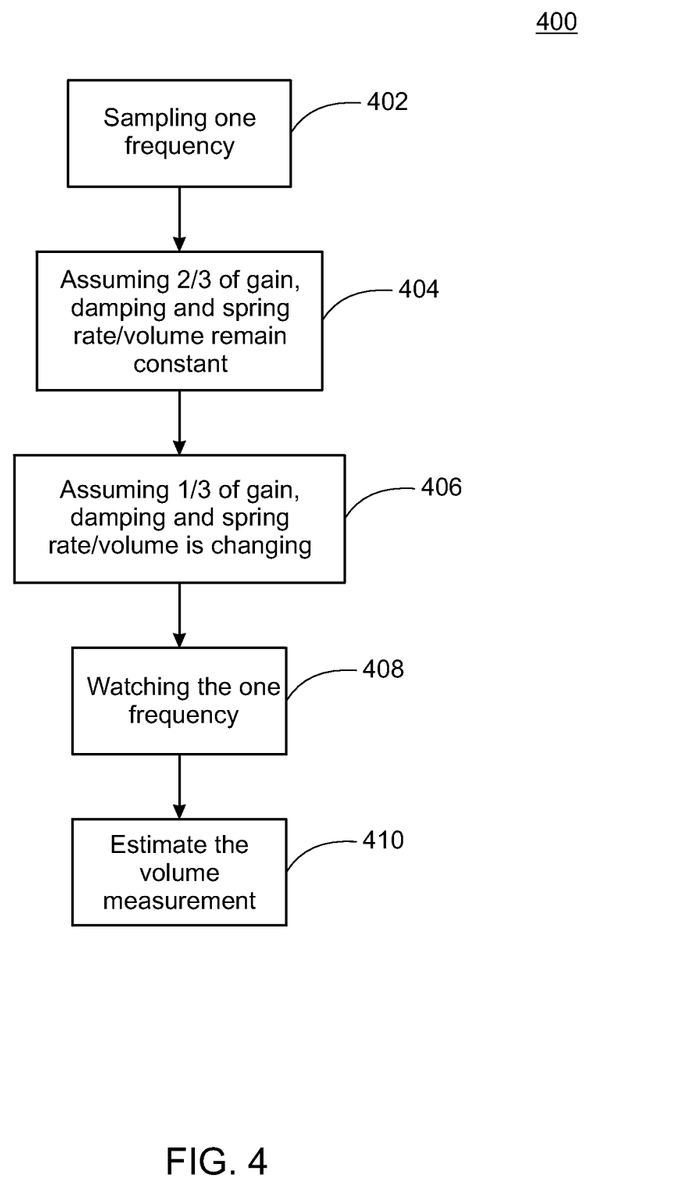
FIG. 4 is a block diagram of one method according to one embodiment.

Referring now to FIG. 4, in some embodiments, the AVS measurement method 400 may include sampling one frequency 402 and watching that one frequency move. For example, where in some embodiments of AVS, resonance is measured by measuring gain, damping and spring rate/volume. In these embodiments, a full sine sweep is used to estimate the three values for gain, damping and spring rate/volume, respectively. In some embodiments, assuming two of the three values/parameters remain constant 404 and assuming one of the three values/parameters is changing 406, by watching that particular frequency going forward 408, from that one point the volume may be estimated 410. Thus, in some embodiments, using this method, volume calculation using AVS may be performed more quickly/efficiently. Although, in various embodiments, this measurement may not be completed in real time, estimated volume measurement may be desirable for many reasons, including, but not limited to, the ability to review what is happening while things are moving.

Figure 5:
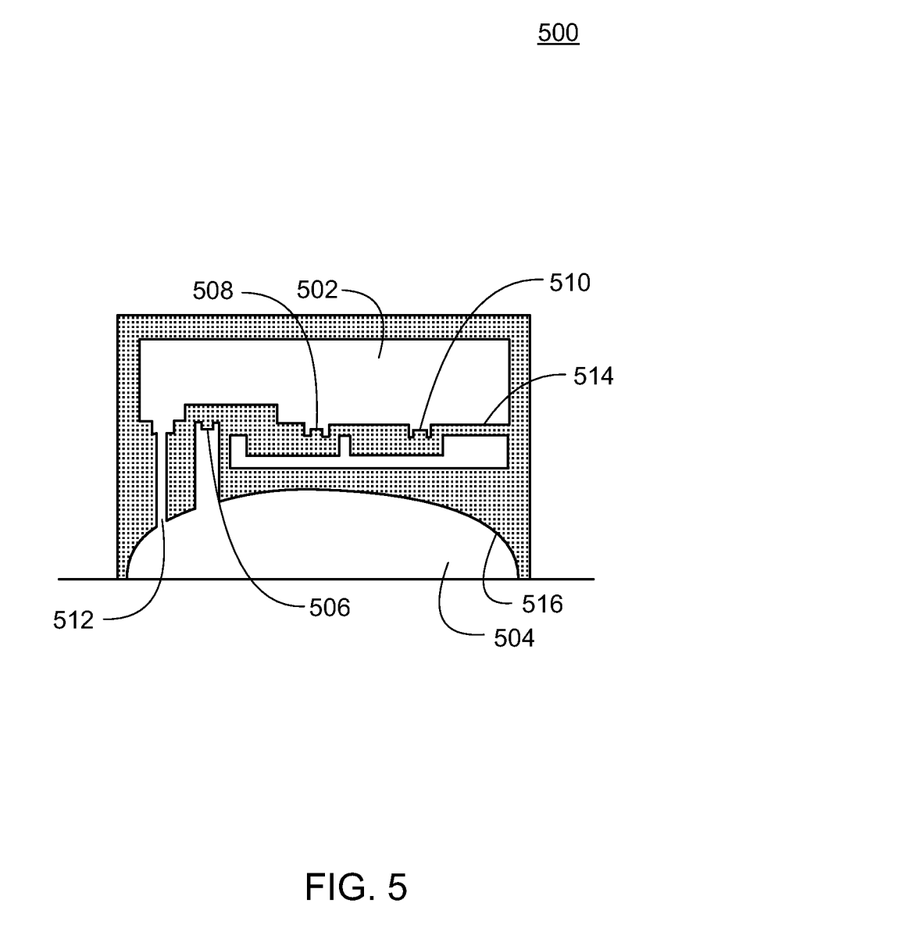
FIG. 5 shows an illustrative view of an embodiment for MEMS AVS.

Referring now also to FIG. 5, in some embodiments, the speaker used in the AVS device may be a traditional voice coil. However, in some embodiments, a MEMS device may replace the speaker in the AVS device. For example, in some embodiments, a microelectomechanical system ("MEMS") device that generates sound using an electrostatic element may be used in an AVS device 500. In some embodiments, the MEMS device that generates sound using an electrostatic element may be similar to a MEMS microphone. The AVS device 500, in some embodiments, may include an AVS housing 516. The components of the AVS are located within the AVS housing 516. In some embodiments, therefore, the AVS device 500 may include a reference volume chamber 502, a variable volume chamber (or volume measurement chamber) 504, MEMS microphones 506, 508, a MEMS speaker 510, a resonant port 512 and a circuit board 514.

Figure 6:
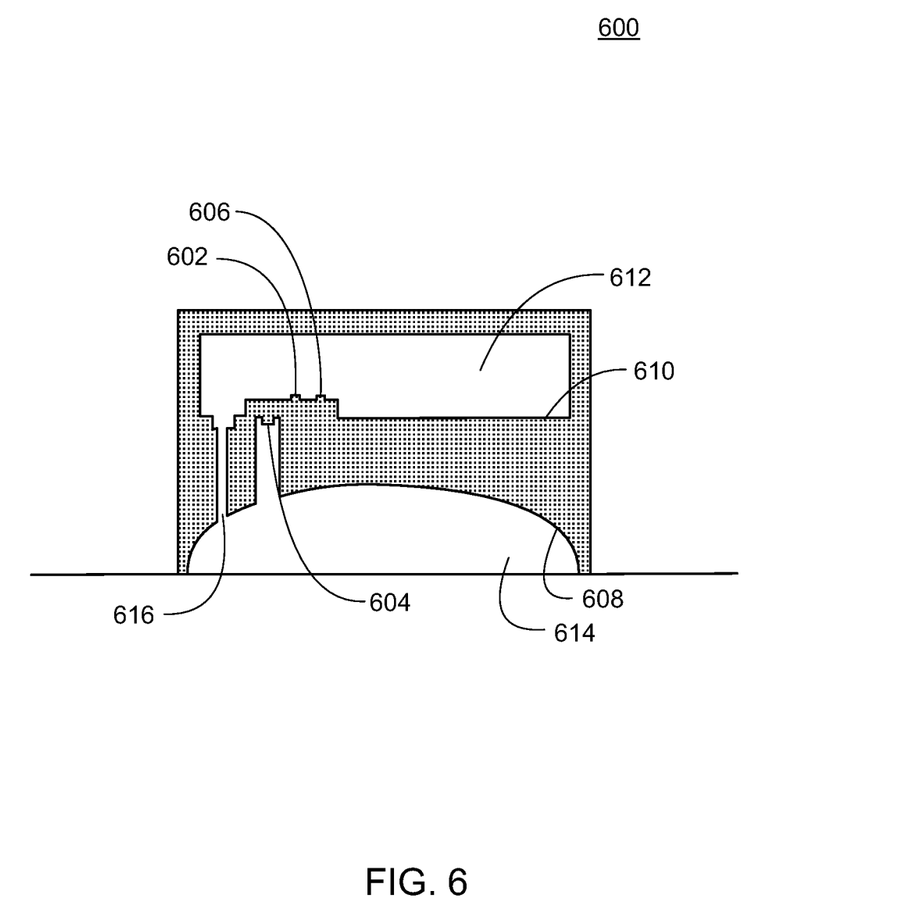
FIG. 6 shows an illustrative view of an embodiment for MEMS AVS.

Referring now to FIG. 6, another embodiment of an AVS device 600 is shown. In some embodiments, the speaker used in the AVS device may be a traditional voice coil. However, in some embodiments, a MEMS device may replace the speaker in the AVS device. For example, in some embodiments, a MEMS device that generates sound using an electrostatic element may be used in an AVS device 600. In some embodiments, the MEMS device that generates sound using an electrostatic element may be similar to a MEMS microphone. In some embodiments, MEMS microphones 602, 604 and the MEMS speaker 606 are integrated into a single package or device with the MEMS microphones 602, 604 on alternate sides of the package/device. The AVS device 600, in some embodiments, may include an AVS housing 608. The components of the AVS are located within the AVS housing 608. In some embodiments, therefore, the AVS device 600 may include a reference volume chamber 612, a variable volume chamber (or volume measurement chamber) 614, MEMS microphones 602, 604, a MEMS speaker 606, a resonant port 616 and a circuit board 610.

In some embodiments of the AVS device 600, the AVS housing 608 may be integrated into the MEMS package/device. The MEMS package, in some embodiments, may integrate the reference chamber 612 and variable chamber 614 as well as the resonant port 616. Thus, in some embodiments, the first and second MEMS microphones 602, 604 and MEMS speaker 606 are also integrated with the reference chamber 612, variable chamber 614 and resonant port 616.

Still referring to FIG. 6, in some embodiments, the package/device as described above may also include, but is not limited to, one or more of the following: a thermistor, analog electronics for driving the speaker 606, signal conditioning for the microphones 602, 604, and/or a DSP for driving AVS. In some embodiments, various embodiments of the package may also be used in active noise cancellation headsets.

A number of embodiments have been described. Nevertheless, it will be understood that various modifications may be made. Accordingly, other embodiments are within the scope of the following claims.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. An infusion pump device comprising:
   an infusion pump;
   an acoustic volume sensing device comprising:
     a housing comprising a reference volume chamber and a variable volume chamber, the reference volume chamber and the variable volume chamber connected by a resonant port;
     a first MEMS microphone located in acoustic relation to the variable volume chamber;
     a second MEMS microphone located in acoustic relation to the reference volume chamber; and
     a MEMS speaker located in acoustic relation to the reference volume chamber;
   wherein the device configured to measure a volume of fluid using acoustic volume sensing measurements, and
   wherein the measurements are taken at the same pressure.

2. The device of claim 1, further comprising a hydrophobic, substantially acoustically transparent mesh device located in the resonant port.

3. The device of claim 1, wherein the first and second MEMS microphone and MEMS speaker are integrated into a single package.

4. The device of claim 1, further comprising a membrane located in the resonant port.

5. The device of claim 4, wherein the membrane is a hydrophobic membrane.

6. The device of claim 1, further comprising a screen located in the resonant port.

7. The device of claim 6, wherein the screen is a hydrophobic screen.

8. The device of claim 1, further comprising an active check valve downstream from the variable volume chamber.

9. The device of claim 1, further comprising a restrictive pathway downstream from the variable volume chamber.

10. The device of claim 1, further comprising a spring and a ring.

11. The device of claim 10, wherein a mesh barrier is sandwiched between the spring and the ring.

12. The device of claim 1, further comprising a thermistor.

13. The device of claim 1, further comprising analog electronics for driving the MEMS speaker.

14. The device of claim 1, further comprising signal conditioning for the MEMS microphones.

15. An infusion pump device comprising:
   an acoustic volume sensing device comprising:
     a housing comprising a reference volume chamber and a variable volume chamber, the reference volume chamber and the variable volume chamber connected by a resonant port;
     a first MEMS microphone located in acoustic relation to the variable volume chamber;
     a second MEMS microphone located in acoustic relation to the reference volume chamber; and
     a MEMS speaker located in acoustic relation to the reference volume chamber;
   wherein the device configured to measure a volume of fluid using acoustic volume sensing measurements, and
   wherein the measurements are taken at different pressures.

16. The device of claim 15, further comprising a hydrophobic, substantially acoustically transparent mesh device located in the resonant port.

17. The device of claim 15, wherein the first and second MEMS microphone and MEMS speaker are integrated into a single package.

18. The device of claim 15, further comprising a membrane located in the resonant port.

19. The device of claim 18, wherein the membrane is a hydrophobic membrane.

20. The device of claim 15, further comprising a screen located in the resonant port.

21. The device of claim 20, wherein the screen is a hydrophobic screen.

22. The device of claim 15, further comprising an active check valve downstream from the variable volume chamber.

23. The device of claim 15, further comprising a restrictive pathway downstream from the variable volume chamber.

24. The device of claim 15, further comprising a spring and a ring.

25. The device of claim 24, wherein a mesh barrier is sandwiched between the spring and the ring.

26. The device of claim 15, further comprising a thermistor.

27. The device of claim 15, further comprising analog electronics for driving the MEMS speaker.

28. The device of claim 15, further comprising signal conditioning for the MEMS microphones.

\* \* \* \* \*